(12) United States Patent
Wu

(10) Patent No.: US 7,064,294 B2
(45) Date of Patent: Jun. 20, 2006

(54) ELECTRIC LOAD CONTROL DEVICE OF HEATING DEVICE OF HEATING BLANKET

(76) Inventor: Shu Chih Wu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/129,700

(22) Filed: May 16, 2005

(65) Prior Publication Data

US 2005/0269307 A1    Dec. 8, 2005

Related U.S. Application Data

(63) Continuation-in-part of application No. 10/846,888, filed on May 17, 2004, now abandoned.

(51) Int. Cl.
*H05B 3/00* (2006.01)

(52) U.S. Cl. ............ 219/212; 219/211; 219/528; 219/529; 219/492; 219/549

(58) Field of Classification Search ............ 219/211, 219/212, 528, 529, 492, 549

See application file for complete search history.

(56) References Cited

U.S. PATENT DOCUMENTS 4,277,671 A * 7/1981 Mori et al. ............ 219/494
6,222,162 B1 * 4/2001 Keane ................... 219/481

FOREIGN PATENT DOCUMENTS

JP        06132069 A  *  5/1994

* cited by examiner

*Primary Examiner*—John A Jeffery
*Assistant Examiner*—Vinod Patel

(57) ABSTRACT

An electric load control device of a heating unit of a heating blanket comprises an actuating unit; a power supply for supplying power to the device; a microprocessor as a control center of the device for generating at least one pulse signal; the microprocessor being actuated by the actuating unit; and a driving unit; the driving unit receiving the at least one pulse signal from the microprocessor for actuating the heating unit to generate heat to heat the heating blanket; the driving unit serving to actuate the heating unit. An actuation time period of the heating unit is controlled by the pulses from the driving unit. In the driving unit, the negative parts of the pulses from the microprocessor are converted into positive pulses so that all the pulses become positive pulses; after the pulses pass through the driving unit, only selective positive pulses are passed.

5 Claims, 3 Drawing Sheets

US 7,064,294 B2

ELECTRIC LOAD CONTROL DEVICE OF HEATING DEVICE OF HEATING BLANKET

The present invention relates is a continuation in part (CIP) of U.S. patent Ser. No. 10/846,888 which is assigned to the inventor of the present invention. Thus, the content of the U.S. patent Ser. No. 10/846,888 is incorporated into the present invention, as a part of the present invention.

FIELD OF THE INVENTION

The present invention relates to heating blankets, and particularly to an electric load control device of a heating device of a heating blanket, wherein the pulse number is used to control the power level of a heating device of a heating blanket so as to avoid overpower conditions to hurt users or to make an accident.

BACKGROUND OF THE INVENTION

In the prior art temperature controlled device of a heating blanket, the difference of temperature must be controlled within a predetermined range to avoid overpower conditions so as to assure a safety operation. However current commercial heating blanks are not so good at this aspect so that they are possible to induce fire accidents or to burn the users. Thereby there is an eager demand for a novel design which can improve such kinds of defects.

Referring to FIG. 6, it is illustrated that in the prior art, the conduction time period is controlled by conduction of a part of a cycle, for example, in FIG. 6, the power is conducted from 90 degrees to 180 degrees in each cycle. It is shown that only one fourth of one cycle is conductive. Thereby the power ratio is 25% of the whole power. However the signal is conducted from some part of the wave instead of from the zero points of the wave. As a result, some harmonic waves are generated and thus the electromagnetic radiation is high. In some areas, the radiation of the heating blanket is limited by laws. Thereby the radiation due to the harmonic waves is often too great to be accepted.

SUMMARY OF THE INVENTION

Accordingly, the primary object of the present invention is to provide an electric load control device of a heating unit of a heating blanket, wherein the pulse number is used to control the power level of a heating unit of a heating blanket so as to avoid overpower conditions to hurt uses or to make an accident.

An electric load control device of a heating unit of a heating blanket comprises an actuating unit; a power supply for supplying power to the device; a microprocessor as a control center of the device for generating at least one pulse signal; the microprocessor being actuated by the actuating unit; and a driving unit; the driving unit receiving the at least one pulse signal from the microprocessor for actuating the heating unit to generate heat to heat the heating blanket; the driving unit serving to actuate the heating unit; wherein an actuation time period of the heating unit is controlled by the pulses from the driving unit; when pulses enter into the heating unit, the heating unit will generate heat. In the driving unit, the negative parts of the pulses from the microprocessor are converted into positive pulses so that all the pulses become positive pulses; after the pulses pass through the driving unit, only selective positive pulses are passed; each of selected pulses is ranged between two zero points; and other pulses not selected are not passed so that a pulse train passing through the driving unit exists silent periods original occupied by unselected pulses.

The various objects and advantages of the present invention will be more readily understood from the following detailed description when read in conjunction with the appended drawing.

BRIEF DESCRIPTION OF THE DRAWINGS

FIG. 2 represents a series continuous pulses; FIG. 3 shows that the negative parts of the continuous waves in FIG. 2 is converted into positive pulses; FIG. 4 shows one embodiment of the present invention, wherein a part of the continuous positive pulses is cut and FIG. 5 shows another embodiment of the present invention, wherein a part of the continuous pulses is cut which is different from that shows in FIG. 4.

DETAILED DESCRIPTION OF THE INVENTION

Figure 1:
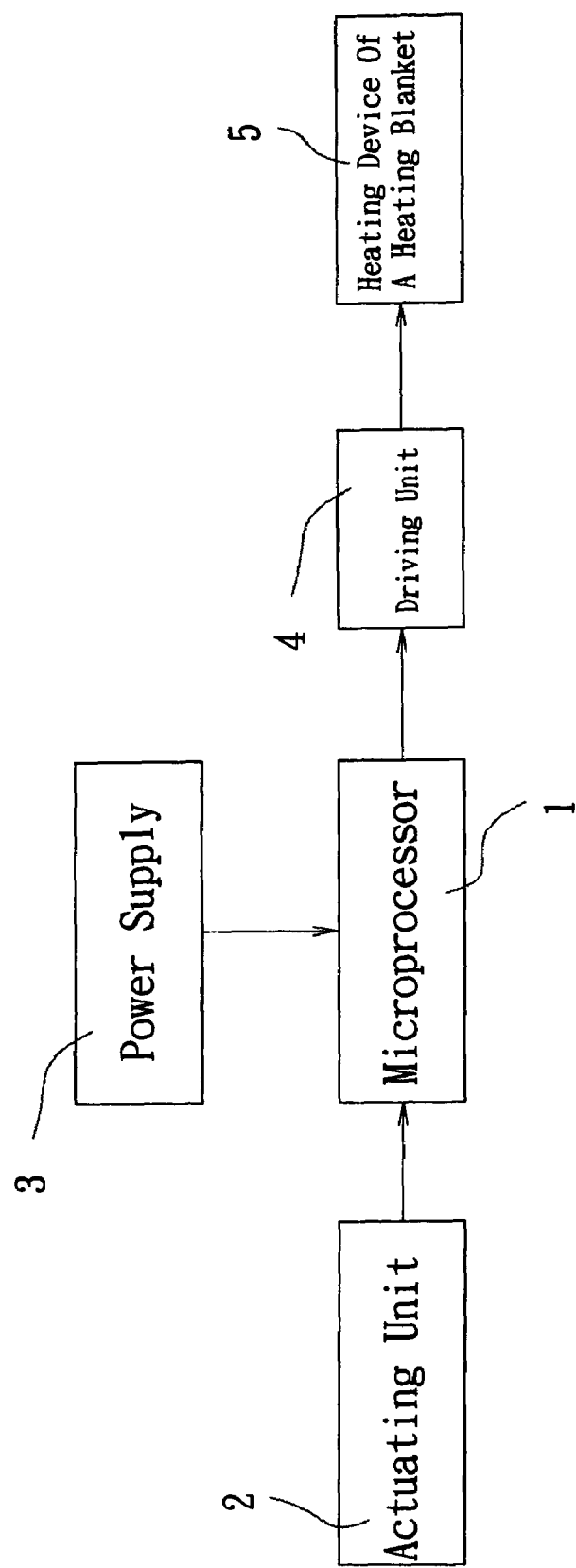
FIG. 1 is a structural block diagram of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 4, an electric load control device of a heating unit 5 of a heating blanket comprises an actuating unit 2 for actuating the device; a power supply 3 for supplying power to the device; a microprocessor 1 as a control center of the device for generating at least one pulse signals when the actuating unit 2 is actuated; a driving unit 4; the driving unit 4 receiving the at least one pulse signals from the microprocessor 1 for controlling the heating time period of the heating unit; the driving unit emitting a driving signal to actuate the heating unit; wherein the heating generating power of the heating unit 5 is related to the numbers of pulses generated by the microprocessor.

In the present invention, the actuating unit 2 is a plurality of keys or the actuating unit 2 is a multi-stage switch for outputting signals to the microprocessor 1 so as to generate pulse signals to the heating unit 5. The heating generating power of the heating unit is related to the numbers of pulses generated by the microprocessor.

Figure 2:
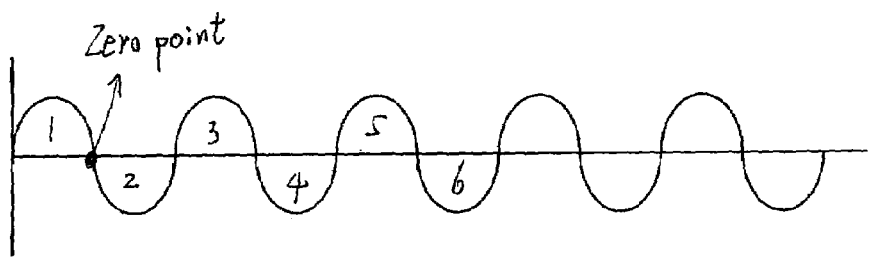
FIGS. 2 to 5 shows the pulse diagrams of the present invention, where
Figure 3:
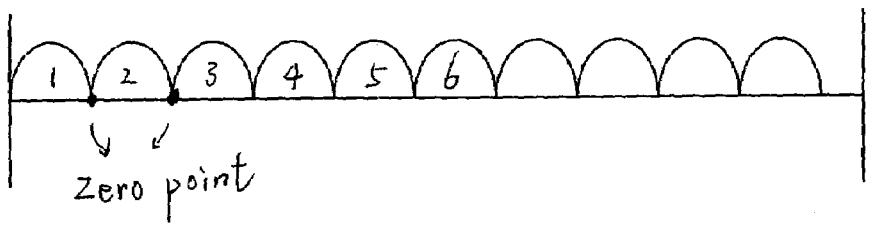
Figure 4:
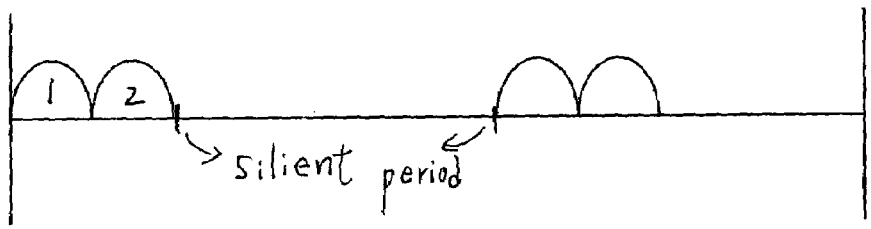
Figure 5:
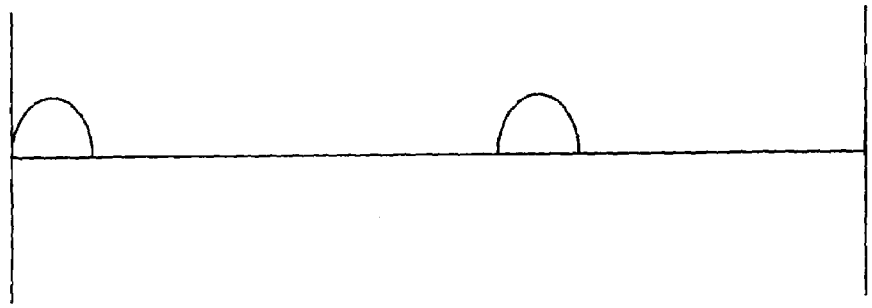
Figure 6:
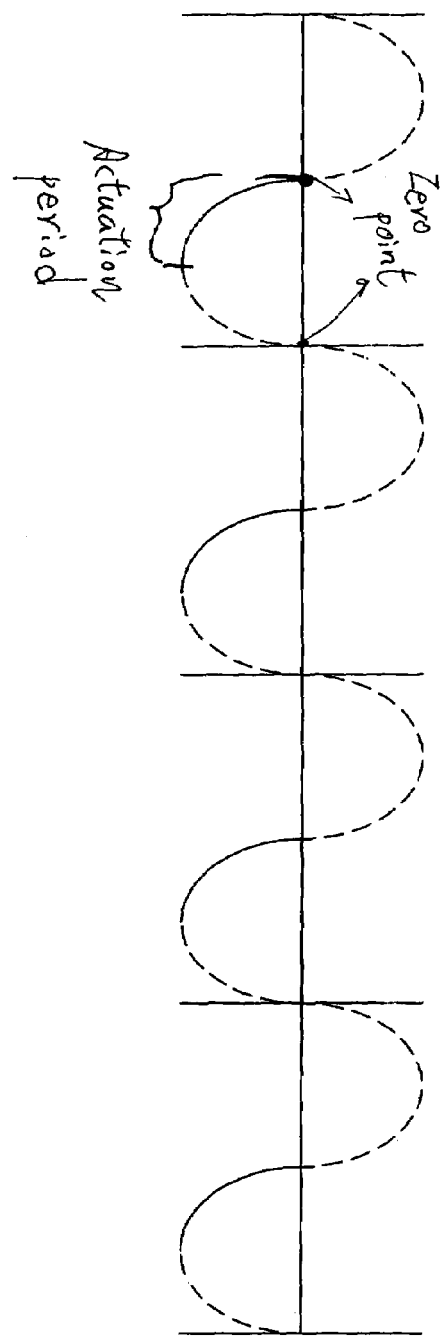
FIG. 6 shows the conduction periods of the pulses in the prior art heating unit of an electric heating blanket.

Referring to FIG. 2, it is illustrated that a series of continuous pulses are generated from the actuating unit 2. In FIG. 3, it is illustrated that all the negative pulses are converted to positive pulses. This is because by converting the negative pulses to positive pulses, the following digital electronic elements for cutting the pulses can be reduced to half and thus the cost is reduced. With reference to FIG. 4, after the pulses of FIG. 3 passes through the driving unit 2, some parts of the continuous positive pulses are cut. For example, in FIG. 4, it is illustrated that for every five positive pulses, there are two pulses being removed so that only three pulses are left. Then the three pulses are inputted into the heating unit 5 for being further transferred to the heating unit 5 for generating heat. In the present invention, the pulses are conducted from a whole half cycle, that is from 0 degree to 180 degrees. Thus no harmonic wave is generated due to the cutting of the wave. In this example, it is illustrated that there are three half cycles being conductive for every five half cycles, and thus 60% of the whole power is generated. In FIG. 5, it is illustrated that only one half cycle is selected for every five half cycles. Thereby, only 20% of the whole power is generated in this example. Thereby in the present invention, the power generation ratio is controlled by the conduction of the number of power cycle.

In one example of the present invention, the pulses are sinusoidal waves, as illustrated in FIGS. 2 to 5.

Furthermore, in the driving unit, the negative parts of the pulses from the microprocessor are converted into positive pulses so that all the pulses become positive pulses; after the pulses pass through the driving unit, only selective positive pulses are passed; each of selected pulses is ranged between two zero points; and other pulses not selected are not passed so that a pulse train passing through the driving unit exists silent periods originally occupied by unselected pulses.

In one embodiment, each pulse generated from the microprocessor is a sinusoidal wave ranged from 0 to 360 degrees and thus each positive pulses is a half cycle of a sinusoidal wave ranged from 0 to 180 degrees; and thus each selected positive pulse is ranged from 0 to 180 degrees.

For example, if three pulses are generated by the microprocessor, and each pulse is conductive at 0 or 180 phase angle for avoiding harmonic interference, when the actuating unit 2 is in a weak level, only one pulse is transmitted. When the actuating unit 2 is in a middle level, two pulses are transmitted. When the actuating unit 2 is in a high level, three pulses are transmitted. The power generated in the heating unit 5 is proportional to the number of pulses of the heating unit.

Moreover, the present invention has the effect of power level control so that the load of the heating blanket is controllable to avoid the overpower of the heating unit so as to protect the users from being hurt.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric load control device of a heating unit of a heating blanket comprising:
    an actuating unit;
    a power supply for supplying power to the device;
    a microprocessor as a control center of the device for generating at least one pulse signal; the microprocessor being actuated by the actuating unit; and
    a driving unit; the driving unit receiving the at least one pulse signal from the microprocessor for actuating the heating unit to generate heat to heat the heating blanket; the driving unit serving to actuate the heating unit; wherein an actuation time period of the heating unit is controlled by the pulses from the driving unit; when pulses enter into the heating unit, the heating unit will generate heat,
    wherein in the driving unit, negative parts of the pulses from the microprocessor are converted into positive pulses so that all the pulses become positive pulses; after the pulses pass through the driving unit, only selective positive pulses are passed; each of selected pulses is ranged between two zero points; and other pulses are not selected are not passed so that a pulse train passing through the driving unit exists silent periods originally occupied by unselected pulses.

2. The electric load control device of a heating unit of a heating blanket as claimed in claim 1, wherein the actuating unit is a plurality of keys.

3. The electric load control device of a heating unit of a heating blanket as claimed in claim 1, wherein the actuating unit is a multi-stage switch.

4. The electric load control device of a heating unit of a heating blanket as claimed in claim 1, wherein only three pulses are generated by the microprocessor.

5. The electric load control device of a heating unit of a heating blanket as claimed in claim 1, wherein each pulse generated from the microprocessor is a sinusoidal wave ranged from 0 to 360 degrees and thus each positive pulses is a half cycle of a sinusoidal wave ranged from 0 to 180 degrees; and thus each selected positive pulse is ranged from 0 to 180 degrees.

* * * * *